United States Patent Office 3,241,975
Patented Mar. 22, 1966

3,241,975
PROCESS FOR MAKING A DRY MILK PRODUCT
Henry S. Brochner, 18 Lystrupvej, Brh,
Copenhagen, Denmark
No Drawing. Filed Dec. 5, 1962, Ser. No. 242,379
9 Claims. (Cl. 99—56)

The present invention relates to improved dairy products. More particularly it relates to a novel process for the manufacture of dry milk products which has a predetermined butter-fat content. Products of the present invention are produced in the form of dry powders, tablets, wafers, cubes or similar small unitary forms such as milk tablets and cream tablets which are readily and substantially completely soluble in hot drinks.

Processes for the conversion of liquid milk including natural or enriched whole milk, condensed milk, skimmed milk and cream into powder form by removing the moisture content are well-known. Heretofore, however, the resulting powder products generally have not been readily soluble in hot water, particularly when compressed into the form of tablets or the like, due to the high content of either casein or butter-fat or both. Further, particularly in the case of tablets or powder having a high butter-fat content, refrigeration of the product has generally proved to be absolutely essential in order to provide an adequate shelf-life.

One method of producing compressed cream tablets having a high degree of solubility in warm drinks has been disclosed in United States Patent 2,839,407, patented June 17, 1958, by the present inventor. Now it has been discovered that milk and cream powders, and tablets produced by compressing such powders, can be manufactured which are readily and substantially completely soluble in hot drinks and at the same time which have a high degree of stability even at environmental temperatures associated for example, with household use. The present invention, which provides a process which permits the manufacture of such milk and cream powders as well as tablets, is based on the discovery of certain specific conditions which must be observed in the processing of milk products in order to obtain powders and tablets of the desired solubility which do not rapidly become rancid in the absence of refrigeration. The conditions involve a definite succession of steps in the treatment and mixing of the natural constituents of milk before the preparation of the final powder product or the compression of that product into tablet form.

Basically, the present invention provides a process for the manufacture of a dry milk product having a predetermined butter-fat content which comprises as a first step the preparation of an intermediate powder. This intermediate powder is produced by mixing a liquid milk of known butter-fat content with a salt-balance agent selected from the class consisting of alkali-metal phosphates and citrates and mixtures thereof, for example, sodium or potassium phosphate or citrate. In order to establish the correct salt balance of the product it is necessary that in the range of about 3.3 to 4.2 wt. percent (based upon the solids content of the liquid milk), of the salt-balance agent be added. This mixture of liquid milk and added salt-balance agent is then pasteurized and lactose is added to form a liquid product in which the added lactose constitutes in the range of 10–24 wt. percent of the total solids content of the resultant liquid product. As a final step the liquid product containing the added lactose is treated to remove the moisture to produce a powder. In accordance with the present invention the dry milk product having a predetermined butter-fat content is produced by preparing the intermediate powder in accordance with the processing steps outlined above using a liquid milk of known butter-fat content, and thereafter mixing additional lactose with the intermediate powder in such proportions as to obtain a resultant dry milk product having that specific predetermined butter-fat content. The dry milk product can thereafter be employed as a powder with hot drinks or alternatively can be compressed into tablet form.

By "liquid milk," as used herein, is meant whole milk, cream or skimmed milk and all mixtures thereof, having a known butter-fat content. Liquid milk can be converted by the process of the instant invention into dry milk products having a fat content in the range of about 10–60% as is desired, depending upon the starting material.

Initially, the correct salt balance of the product is established in order to insure solubility and stability by mixing a liquid milk of known butter-fat content with in the range of about 3.3 to 4.2 wt. percent, based upon the solids content of the liquid milk, of an alkali-metal phosphate or citrate, or mixtures thereof. It is now known that the addition of the salt-balance agent to the liquid milk binds such a proportion of the calcium content of the liquid milk as to impart maximum solubility to the casein contained therein.

The liquid milk employed in the process can be milk or cream of any desired butter-fat content depending on the desired butter-fat content and the lactose content of the final product. In some instances instead of using only one batch of liquid milk of a certain fat content, it is desirable to obtain the same quantity of butter-fat by using a batch of skimmed milk and a batch of milk or cream having a higher butter-fat content and mixing the two in proportions calculated to produce the exact butter-fat content desired. Preferably in such cases the citrate or phosphate necessary for the establishment of the salt balance is added to the skimmed milk which contains the major proportions of the casein and allowed to react for a few minutes before the skimmed milk portion containing the salt-balance agent is mixed with the milk or cream. In any event, preferably the citrate and/or phosphate is left to react with the liquid milk for a period of time for example, about 50 to 65 minutes. The reaction time and the selection of the salt-balance agent depends to some extent upon the expected environmental temperature in which the final product will be used. Utilization of a phosphate for this step generally softens the casein more than the reaction with a citrate. Accordingly, if the final dry milk product is being manufactured for use in a relatively hot climate, a citrate salt-balance agent is preferred.

After the mixture of liquid milk and salt-balance agent is prepared, the mixture is generally pasteurized preferably at a temperature not exceeding about 75° C. Thereafter a quantity of lactose is added to the pasteurized mixture, the amount of lactose utilized being sufficient to constitute in the range of about 10 to 24 percent by weight of the total solids content of the mixture formed. Surprisingly, it has now been found that the addition of some lactose prior to homogenization and the condensing of the liquid product to a powder, markedly improves the solubility of the dry milk product produced. In accordance with the instant invention, the remainder of the lactose is added to the product only after the intermediate powder has been prepared.

Generally, the pasteurized mixture containing added lactose is homogenized in conventional equipment and the homogenized liquid product is condensed to a solids content of approximately 34 to 47%. More specifically, the homogenized liquid product is condensed to a solids content corresponding to a specific gravity in the range of 1.03 to 1.10, the particular value depending upon the proportion of butterfat. Preferably, the condensing process will not be carried on to a solids content much higher than about 45%. It is essential, however, that the condensed liquid product falls within the specific gravity limits given above. Otherwise a powder made by spray-drying the condensed product cannot satisfactorily be compressed into readily soluble tablets because either the powder will be too dense and under pressure some of the fat will be squeezed out of it, or it will be too loose and require an excessive pressure which also results in the squeezing out of some of the fat. Conventional drying equipment can be employed. The final moisture content of the intermediate powder preferably should fall in the range of about ½% to 5%, the lower percentages generally being employed for powders of higher fat contents.

The intermediate powder of the process of the instant invention is mixed in the dry state with lactose, the proportions thereof depending on the desired butterfat content of the final dry milk product. Where it is desired to produce tablets, preferably the intermediate powder together with the added additional lactose is moistened with from 2% to 20% by weight of water. The amount of water added at this stage is important in determining the stability of the final product. If too little water is added, the powder particles will not stick together properly when compressed and if too much water is added, the casein will be partially dissolved and therefrore cannot properly protect the butterfat from becoming rancid. Advantageously, the amount of water to be added at this stage is calculated by the use of the following formula: The amount by weight of protein in the batch divided by the total batch weight of the powder, multiplied by the specific gravity of the condensed liquid product at 20° C., multiplied by 100 equals the percentage of water to be added.

Preferably, the water is added in a manner insuring uniform distribution as by atomizing the water in a fine mist while the powder is being stirred in the container. After the powder has been moistened, it is preferably granulated—for example, by being passed through a sieve and thereafter compressed into the desired tablet or cube form. In one example, granulation can be obtained using a vibrating sieve having openings of 1 to 3 mm. Following the compression into the desired shape, the tablets are generally dried to reduce the moisture content to not more than about 2%.

The novel process of the instant invention is more fully illustrated by the following example which is given for illustrative purposes only and is not to be construed as limiting in any way the scope of the present invention.

In this example, 18,350 kgs. of skimmed milk was mixed with 634.5 kgs. of sodium phosphate (secondary salt) and the mixture was allowed to react for about 30 minutes. Thereafter 36,650 kgs. of a 36% butter-fat cream was stirred into the mixture which was then allowed to react for a further 30 minutes. To illustrate the invention further, for example, the same porportions of the milk solids can be obtained by using 55,000 kgs. of cream containing 24% butterfat instead of the above mixture of skimmed milk and 36% butter-fat cream. The mixture was then pasteurized by heating to 74° C.

Thereafter 3,361 kgs. of lactose were added and the thereby obtained liquid milk product was homogenized in the usual manner. The homogenized liquid product which had approximately 39% solids was then condensed at 55° C. and a pressure of 720 millibars until its solids content was 45%. The end point of the condensing step is determined by withdrawing samples at intervals and measuring the specific gravity. Condensing was stopped when the specific gravity reached 1.057.

Next, the condensed milk was spray-dried to form the intermediate powder in a conventional atomizer. The composition of this powder calculated as solids was 62.98%) butterfat, 17.95% non-fat milk solids, 3.03% salts and 16.04% added lactose.

Then 20,958 kgs. (60 parts by weight) of the intermediate powder were mixed in the dry state with 13,972 kgs. (40 parts by weight) of powdered lactose, and this resulted in a final product containing about 38% fat and 1.8% salt, suitable for making a milk tablet. This product was then whirled in an open kettle and at the same time sprayed with a fine mist of water in the amount of 1,747 kgs. The moistened powder was then in a condition ready for making tablets. However, first it was granulated by being passed through a sieve with openings of 2 mm., and then the granulate was compressed to tablets having a volume of about 60% of the volume of the loose powder. The tablets were readily soluble in hot drinks and imparted to the drinks the same milky colour as a liquid milk product.

It is to be understood that the above described arrangements and techniques are but illustrative of the application of the principles of the invention. Numerous other arrangements and procedures can be devised by those skilled in the art without departing from the spirit and scope of the invention.

What is claimed is:

1. A process for the manufacture of a dry milk product having a predetermined butter-fat content, which comprises
   preparing an intermediate powder by
      mixing a liquid milk of known butter-fat content with about 3.3–4.2 wt. percent, based upon the solids content of the liquid milk, of a salt-balance agent selected from the class consisting of alkali-metal phosphates and citrates and mixtures thereof,
      pasteurizing the mixture,
      adding lactose to the mixture to form a liquid product in which the added lactose constitutes in the range of about 10–24 wt. percent of the total solids content thereof, homogenizing the liquid product,
      condensing the liquid product, and
      drying condensed liquid product to a powder,
   and thereafter mixing additional lactose with said intermediate powder in an amount sufficient to obtain a resultant dry milk product having said predetermined butter-fat content.

2. A process for the manufacture of a dry milk product having a predetermined butter-fat content which comprises,
   preparing an intermediate powder by
      mixing a liquid milk of known butter-fat content with about 3.3–4.2 wt. percent, based upon the solids content of the liquid milk, of a salt-balance agent selected from the class consisting of alkali-metal phosphates and citrates and mixtures thereof,
      pasteurizing the mixture,
      adding lactose to the mixture to form a liquid product in which the added lactose constitutes in the range of about 10–24 wt. percent of the total solids content thereof homogenizing the liquid product,
      condensing the liquid product, and
      drying the condensed liquid product to a powder,
   thereafter mixing additional lactose with said intermediate powder in an amount sufficient to obtain a resultant dry milk product having said predetermined butter-fat content, and
   compressing the dry milk product to form tablets.

3. A process for the manufacture of a dry milk product having a predetermined butter-fat content which comprises,
   preparing an intermediate powder by
      mixing a liquid milk of known butter-fat content with about 3.3–4.2 wt. percent, based upon the solids content of the milk, of a salt-balance agent selected from the class consisting of alkali-metal phosphates and citrates and mixtures thereof, pasteurizing the mixture at a temperature not exceeding 75° C., adding lactose to the pasteurized mixture to form a liquid product in which the added lactose constitutes in the range of about 10–24 wt. percent of the total solids content thereof, homogenizing the liquid product, condensing the liquid product, and drying the condensed liquid product to a powder having a moisture content not exceeding about 5%, and thereafter mixing additional lactose with said intermediate powder in an amount sufficient to obtain a resultant dry milk product having said predetermined butter-fat content.

4. A process for the manufacture of a dry milk product having a predetermined butter-fat content which comprises, preparing an intermediate powder by mixing a liquid milk of known butter-fat content with about 3.3–4.2 wt. percent, based upon the solids content of the liquid milk, of a salt-balance agent selected from the class consisting of alkali-metal phosphates and citrates and mixtures thereof, pasteurizing the mixture at a temperature not exceeding 75° C., adding lactose to the pasteurized mixture to form a liquid product in which the added lactose constitutes in the range of about 10–24 wt. percent of the total solids content thereof, homogenizing the liquid product, condensing the homogenized liquid product, and drying the condensed homogenized liquid product to a powder, and thereafter mixing additional lactose with said intermediate powder in an amount sufficient to obtain a resultant dry milk product having said predetermined butter-fat content.

5. A process for the manufacture of a dry milk product having a predetermined butter-fat content which comprises, preparing an intermediate powder by mixing a liquid milk of known butter-fat content with about 3.3–4.2 wt. percent, based upon the solids content of the liquid milk, of a salt-balance agent selected from the class consisting of alkali-metal phosphates and citrates and mixtures thereof, reacting said salt-balance agent with said liquid milk at room temperature for a period of time in the range of about 50–65 minutes, pasteurizing the mixture at a temperature not exceeding 75° C., adding lactose to the pasteurized mixture to form a liquid product in which the added lactose constitutes in the range of about 10–24 wt. percent of the total solids content thereof, homogenizing the liquid product, condensing the homogenized liquid product, and drying the condensed homogenized liquid product to a powder, and thereafter mixing additional lactose with said intermediate powder in such proportions as to obtain a resultant dry milk product having said predetermined butter-fat content.

6. A process for the manufacture of a dry milk product having a predetermined butter-fat content which comprises, preparing an intermediate powder by mixing a liquid milk of known butter-fat content with about 3.3–4.2 wt. percent, based upon the solids content of the liquid milk, of a salt-balance agent selected from the class consisting of alkali metal phosphates and citrates and mixtures thereof, reacting said salt-balance agent with said liquid milk at room temperature for a period of time in the range of about 50–65 minutes, pasteurizing the mixture at a temperature not exceeding 75° C., adding lactose to the pasteurized mixture to form a liquid product in which the added lactose constitutes in the range of about 10–24 wt. percent of the total solids content thereof, homogenizing the liquid product, condensing the homogenized liquid product to a solids content corresponding to a specific gravity in the range of about 1.03–1.10, and drying the condensed homogenized liquid poduct to a powder having a moisture content not exceeding about 5%, and thereafter mixing additional lactose with said intermediate powder in an amount sufficient to obtain a resultant dry milk product having said predetermined butter-fat content.

7. A process for the manufacture of a dry milk product having a predetermined butter-fat content which comprises, preparing an intermediate powder by mixing a liquid milk of known butter-fat content with about 3.3–4.2 wt. percent, based upon the solids content of the liquid milk, of a salt-balance agent selected from the class consisting of alkali-metal phosphates and citrates and mixtures thereof, pasteurizing the mixture, adding lactose to the pasteurized mixture to form a liquid product in which the added lactose constitutes in the range of about 10–24 wt. percent of the total solids content thereof, homogenizing the liquid product and, drying the liquid product to a powder, and thereafter mixing additional lactose with said intermediate powder in such proportions as to obtain a resultant dry milk product having said predetermined butter-fat content.

8. A process for the manufacture of a dry milk product having a predetermined butter-fat content which comprises, preparing an intermediate powder by mixing a liquid milk of known butter-fat content with about 3.3–4.2 wt. percent, based upon the solids content of the liquid milk, of a salt-balance agent selected from the class consisting of alkali-metal phosphates and citrates and mixtures thereof, pasteurizing the mixture, adding lactose to the pasteurized mixture to form a liquid product in which the added lactose constitutes in the range of about 10–24 wt. percent of the total solids content thereof, homogenizing the liquid product and, drying the liquid product to a powder, thereafter mixing additional lactose with said intermediate powder in an amount sufficient to obtain a resultant dry milk product having said predetermined butter-fat content, and compressing the dry milk product to form tablets.

9. A process for the manufacture of a dry milk product having a predetermined butter-fat content which comprises, preparing an intermediate powder by mixing a liquid milk of known butter-fat content with about 3.3–4.2 wt. percent, based upon the solids content of the liquid milk, of a salt-balance agent selected from the class consisting of alkali-metal phosphates and citrates and mixtures thereof, reacting said salt-balance agent with said liquid milk at room temperature for a period of time in the range of about 50–65 minutes, pasteurizing the mixture at a temperature not exceeding 75° C., adding lactose to the pasteurized mixture to form a liquid product in which the added lactose constitutes in the range of about 10–24 wt. percent of the total solids content thereof, homozenizing the liquid product, condensing the homogenized liquid product to a solids content corresponding to a specific gravity in the range of about 1.03–.110, and drying the condensed homogenized liquid product to a powder having a moisture content not exceeding about 5%, thereafter mixing additional lactose with said intermediate powder in an amount sufficient to obtain a resultant dry milk product having said predetermined butter-fat content, moistening the dry milk product within the range of about 2–20 wt. percent of water, granulating the moistened dry milk product, compressing the granulated, moistened product to form tablets, and drying the tablets.

References Cited by the Examiner
UNITED STATES PATENTS

| | | | |
|---|---|---|---|
| 2,645,579 | 7/1953 | Kempf et al. | 99—56 |
| 2,933,393 | 4/1960 | Ortman | 99—56 |

A. LOUIS MONACELL, *Primary Examiner.*